United States Patent
Bucher

(10) Patent No.: US 10,619,522 B2
(45) Date of Patent: Apr. 14, 2020

(54) HEAT RECOVERY APPARATUS

(71) Applicant: Mahle International GmbH, Stuttgart (DE)

(72) Inventor: Michael Bucher, Berlin (DE)

(73) Assignee: Mahle International GmbH (DE)

(*) Notice: Subject to any disclaimer, the term of this patent is extended or adjusted under 35 U.S.C. 154(b) by 120 days.

(21) Appl. No.: 15/840,752

(22) Filed: Dec. 13, 2017

(65) Prior Publication Data

US 2018/0171830 A1 Jun. 21, 2018

(30) Foreign Application Priority Data

Dec. 15, 2016 (DE) .................. 10 2016 225 091

(51) Int. Cl.
| | |
|---|---|
| *F01K 23/10* | (2006.01) |
| *F01K 23/06* | (2006.01) |
| *F02G 5/00* | (2006.01) |
| *F01K 9/00* | (2006.01) |
| *F02G 5/02* | (2006.01) |
| *F02B 67/04* | (2006.01) |
| *F02B 67/08* | (2006.01) |

(52) U.S. Cl.
CPC .............. *F01K 23/101* (2013.01); *F01K 9/00* (2013.01); *F01K 23/065* (2013.01); *F01K 23/10* (2013.01); *F02G 5/00* (2013.01); *F02B 67/04* (2013.01); *F02B 67/08* (2013.01); *F02G 5/02* (2013.01); *Y02T 10/166* (2013.01)

(58) Field of Classification Search
CPC .......... F01K 9/00; F01K 23/101; F01K 23/10; F01K 23/065; F02G 5/00; F02G 5/02; F02B 67/04; F02B 67/08; Y02T 10/166
See application file for complete search history.

(56) References Cited

U.S. PATENT DOCUMENTS 3,686,867 A * 8/1972 Hull .................. F01K 19/08
   60/667
3,858,395 A * 1/1975 Davoud .................. F01K 19/04
   60/688

(Continued)

OTHER PUBLICATIONS

Innovative Organic Rankine Cycle with Gas-Liquid Injector Pressurization by Zhu Hua-Yun, Xu Zhi-Ming (Year: 2016).*

*Primary Examiner* — Mark A Laurenzi
*Assistant Examiner* — Shafiq Mian
(74) *Attorney, Agent, or Firm* — Fishman Stewart PLLC

(57) ABSTRACT

A heat recovery apparatus having a circuit that during operation circulates a working medium. The circuit may include an evaporator to evaporate the working medium, an expander arranged downstream of the evaporator to expand the working medium, and a condenser arranged downstream of the expander configured to condense the working medium. The expander may include a shaft to draw a torque at the expander. An injector pump may drive the working medium. The injector pump may include a driving fluid inlet, a suction inlet, and an injector outlet. The driving fluid inlet may be fluidically connected to the circuit between the evaporator and the expander. The suction inlet may be fluidically connected to the circuit between the condenser and the evaporator. The injector outlet may be fluidically connected to the circuit between the suction inlet and the evaporator.

20 Claims, 3 Drawing Sheets

(56) References Cited

U.S. PATENT DOCUMENTS

| | | | |
|---|---|---|---|
| 6,672,102 B1* | 1/2004 | Huenniger | F25B 1/047 |
| | | | 62/472 |
| 9,062,898 B2* | 6/2015 | Held | F25B 1/06 |
| 10,125,639 B2* | 11/2018 | Noureldin | F01K 21/005 |
| 2009/0071156 A1* | 3/2009 | Nishikawa | F01K 13/02 |
| | | | 60/660 |
| 2010/0018207 A1* | 1/2010 | Juchymenko | F01K 23/065 |
| | | | 60/670 |
| 2012/0128463 A1* | 5/2012 | Held | F01K 23/10 |
| | | | 415/1 |
| 2012/0131921 A1* | 5/2012 | Held | F01K 25/08 |
| | | | 60/671 |
| 2013/0277448 A1* | 10/2013 | Liu | F04F 5/461 |
| | | | 239/11 |
| 2014/0373544 A1* | 12/2014 | Mohan | F01K 9/003 |
| | | | 60/670 |
| 2015/0267638 A1* | 9/2015 | Morris | F02G 5/02 |
| | | | 165/51 |
| 2016/0024923 A1* | 1/2016 | Versteyhe | F01K 25/08 |
| | | | 92/13 |
| 2016/0123191 A1 | 5/2016 | Morris et al. | |
| 2017/0058711 A1* | 3/2017 | Noureldin | F01K 21/005 |
| 2018/0224227 A1* | 8/2018 | Durham, III | F41A 3/26 |

* cited by examiner

HEAT RECOVERY APPARATUS

CROSS-REFERENCE TO RELATED APPLICATION

This application claims priority to German Application DE 10 2016 225 091.4 filed on Dec. 15, 2016, the contents of which is hereby incorporated in its entirety.

TECHNICAL FIELD

The present invention relates to a heat recovery apparatus with a circuit, in which a working medium circulates, according to the preamble of claim 1. The invention, furthermore, relates to a method for operating such a heat recovery apparatus.

With the help of a heat recovery apparatus it is possible to extract energy from heat or waste heat, for example of an internal combustion engine. The recovered energy in this case can be drawn in the form of mechanical energy or a torque. In the case of an internal combustion engine, this waste heat can originate from the exhaust gas of the internal combustion engine. Such a heat recovery apparatus, for this purpose, comprises a circuit in which during the operation a working medium circulates and in which an evaporator for evaporating the working medium, which is supplied with said waste heat, an expander for expanding the working medium, from which said mechanical energy is drawn for example in the form of a torque, for expanding the working medium and a condenser for condensing the working medium are provided one after the other. For operating the heat recovery apparatus it is additionally necessary to deliver the working medium in the circuit.

For delivering the working medium, mechanically and/or electrically driven delivery devices, such as for example pumps, can be employed in principle. Since such delivery devices for delivering the working medium require energy, the overall energy efficiency of the heat recovery apparatus is reduced however. In addition to this, mechanical and/or electrical delivery devices require a suitable mounting in the heat recovery apparatus and/or a suitable supply, which render the manufacture of the heat recovery apparatus more difficult and/or increase the manufacturing costs.

BACKGROUND

The present invention therefore deals with the object of stating improved or at least alternative embodiments for a heat recovery apparatus of the type mentioned at the outset and for a method for operating such a heat recovery apparatus, which are characterized in particular by an improved efficiency and/or a simplified construction of the heat recovery apparatus.

According to the invention, this object is solved through the subjects of the independent claims. Advantageous embodiments are subject of the dependent claims.

SUMMARY

The present invention is based on the general idea of employing an injector pump with a heat recovery apparatus having a circuit in which a working medium circulates during the operation, which injector pump at least partly/alternatively drives and thus delivers the working medium, wherein a driving fluid of the injector pump is the working medium. Accordingly, the working medium is delivered by the working medium already circulating in the circuit so that the overall energy efficiency or the efficiency of the heat recovery apparatus is improved. In addition to this, additional installations for delivering the working medium can be omitted, dimensioned at least smaller and/or be alternatively employed so that in turn the efficiency of the heat recovery apparatus is improved and/or the heat recovery apparatus is simplified and/or can be produced more cost-effectively. According to the inventive idea, the heat recovery apparatus comprises the circuit, in which during the operation of the heat recovery apparatus the working medium circulates. In the circuit, an evaporator for evaporating the working medium, an expander for expanding the working medium arranged downstream of the evaporator and a condenser for condensing the working medium arranged downstream of the expander, which is arranged upstream of the evaporator, are provided. Here, the expander comprises a shaft for drawing a torque on the expander. According to the invention, the injector pump is provided for driving the working medium, which pump has a driving fluid inlet, a suction inlet and an injector outlet. The driving fluid inlet is fluidically connected to the circuit between the evaporator and the expander while the suction inlet is fluidically connected to the circuit between the condenser and the evaporator. In addition, the injector outlet is fluidically connected to the circuit between the suction inlet or its connecting point with the circuit and the evaporator.

During the operation of the heat recovery apparatus, working medium is evaporated in the evaporator in that the evaporator is supplied with heat or waste heat, for example of an internal combustion engine. The evaporated working medium flows to the expander where it is expanded and subsequently to the condenser where it is condensed. The condensed working medium subsequently flows again to the evaporator. The arrangement of the injector pump according to the invention thus utilises the circumstance that the working medium is evaporated between the evaporator and the expander and is present in the substantially liquid form between the condenser and the evaporator. Accordingly, evaporated working medium enters the injector via the driving fluid inlet and ensures driving the working medium. This can be realised in the known manner, for example by way of a nozzle. By way of this, the evaporated working medium is accelerated and substantially sucks in liquid working medium through the suction inlet and accelerates the same. As a consequence, the evaporated working medium is mixed with the substantially liquid medium and let out of the injector outlet under pressure. Consequently the working medium is driven or delivered in the circuit.

In preferred embodiments, the heat recovery apparatus comprises a storage device for storing the working medium, which is or can be fluidically connected to the circuit between the injector outlet and the evaporator. The storage device serves for the purpose of storing the working medium so that the storage device can be filled with working medium or working medium from the storage device can be introduced into the circuit. Thus it is possible, in particular, to react to different requirements on the heat recovery apparatus and/or operate the heat recovery apparatus in different modes. In principle, the storage device can be designed in any manner. It is conceivable to design the storage device as a pressure storage device and/or as a spring-preloaded storage device.

Versions, in the case of which an evaporator valve device for adjusting the flow of the working medium to the evaporator is arranged between the injector outlet and the evaporator, prove to be advantageous. The evaporator valve device thus allows adjusting the volumetric flow of the working medium to the evaporator and thus ultimately also the flow of the working medium to the driving fluid inlet of the injector pump. The evaporator valve device thus adjusts, on the one hand, the volumetric flow of the working medium that reaches the evaporator and can, on the other hand, be employed in order to influence a flow of the evaporated working medium to the driving fluid inlet of the injector pump.

According to an advantageous embodiment, an injector valve device is arranged between the evaporator and the driving fluid inlet, which serves for adjusting the flow of the working medium to the driving fluid inlet of the injector pump. With the injector valve device it is thus possible to adjust the volumetric flow of the working medium flowing into the driving fluid inlet of the injector pump and thus vary the output of the injector pump.

Alternatively or additionally, the injector pump can have an integrated adjusting device for adjusting the flow of the working medium through the injector pump. This means that within the injector pump the volumetric flow of the evaporated working medium flowing into the driving fluid inlet can be adjusted. Alternatively or additionally, the adjusting device can be employed in order to adjust the volumetric flow of the working medium which flows into the suction inlet of the injector pump.

Preferred are also configurations in the case of which the heat recovery apparatus comprises an expander bypass for bypassing the expander and an expander valve device for adjusting the flow of the working medium through the expander bypass. The expander valve device thus allows adjusting the volumetric flow of the working medium through the expander or through the expander bypass. The expander valve device and the expander bypass allow, in particular, adjusting the proportion of the working medium which is expanded by means of the expander. The expander bypass branches off the circuit preferentially upstream of the expander and downstream of the evaporator, particularly preferably downstream of the fluidic connection of the driving fluid inlet of the injector pump and leads into the circuit downstream of the expander and upstream of the condenser.

The expander valve device can be configured, in principle as desired. It is conceivable to provide the expander valve device with two valves, wherein one of the valves is arranged in the circuit upstream of the expander and one of the valves in the expander bypass. Thus, a more variable adjustment of the volumetric flow through the expander and through the expander bypass is possible.

Advantageous versions are characterized by a tank arranged in the circuit between the condenser and the suction inlet, with a volume for the working medium. The tank or the volume of the tank serve for keeping a supply of the working medium. Here, the volume of the tank is adjustable. To this end, preferentially a diaphragm and a compressed-air device adjusting the diaphragm in the tank for changing the volume for the working medium is preferentially provided in the tank. Particularly preferably, the diaphragm is designed as a bag which is inflatable by means of the compressed-air device, wherein the compressed-air device additionally serves for draining air from the bag.

The tank is advantageously employed for adjusting a preset temperature at the suction inlet of the injector pump. Particularly preferably, the volume of the tank for keeping a supply of the working medium, in particular with the help of the diaphragm and the compressed-air device, is adjusted in such a manner that the working medium is supercooled at the suction inlet of the injector pump.

In principle, the injector pump can be the only part of the heat recovery apparatus driving or delivering the working medium in the circuit.

It is likewise conceivable to provide the heat recovery apparatus with a delivery device for driving the working medium, which is present additionally to the injector pump. The delivery device is advantageous arranged in the circuit between the condenser and the evaporator, in particular between the suction inlet of the injector pump and the condenser and/or between the tank and the suction inlet of the injector pump.

In principle, the delivery device can be configured in any way, wherein the delivery device is preferentially driven electrically and/or mechanically.

Embodiments, in which the delivery device is driven via the shaft of the expander are preferred. Thus, the efficiency of the heat recovery apparatus can be improved.

In principle, the expander is configured in any way provided it expands the working medium and makes available a torque that can be drawn. The expander is advantageously designed as an axial piston machine that is driven by the working medium and thus makes available the torque that can be drawn at the shaft.

The injector pump can be employed, in particular, in order to fill the storage device of the heat recovery apparatus with working medium. Here, a method for operating the heat recovery apparatus, in which the injector pump fills the storage device with working medium, is also included in the scope of this invention.

Preferably, the storage device is filled with the help of the injector pump when this is permitted by resources and/or in the presence of a suitable operating state of the heat recovery apparatus.

Advantageously, the storage device is filled with the help of the injector pump when the working medium is conducted, at least partially, past the expander, in particular via the expander bypass. This is the case in particular when no torque is to be drawn at the expander. In this case, the extracted heat energy can be employed, by means of the injector pump, to fill the storage device. Such an operating state is present during the operation of the heat recovery apparatus in a motor vehicle in particular when the motor vehicle or the internal combustion engine is operated in a coasting mode and/or in a braking mode. In the braking mode, the internal combustion engine is employed for braking the motor vehicle while in the coasting mode the motor vehicle is driven without additional acceleration.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

It shows, in each case schematically.

DETAILED DESCRIPTION

Figure 1:
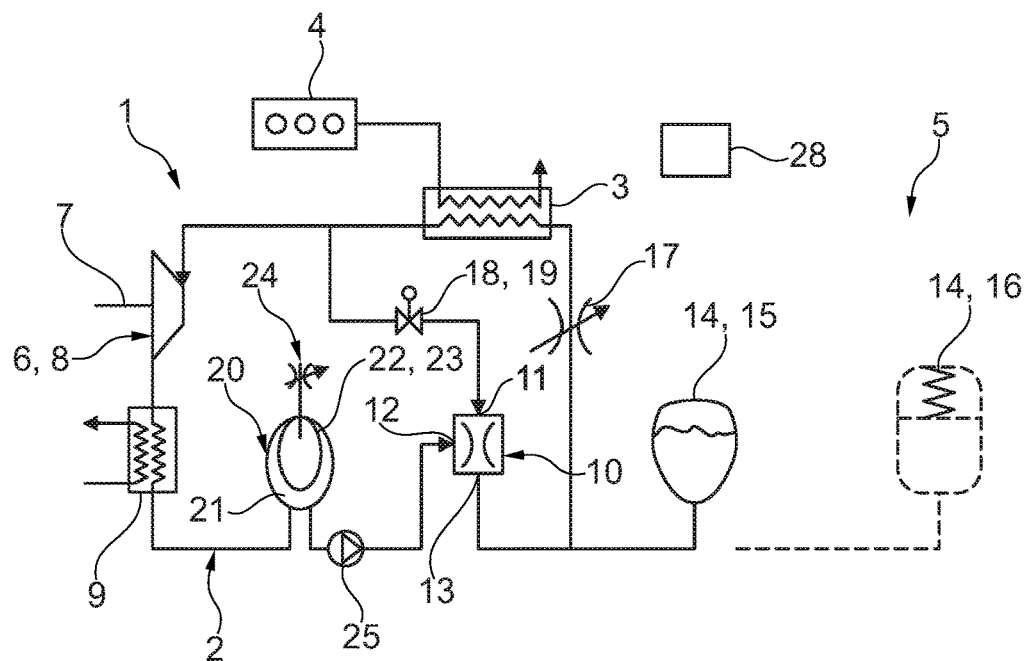
FIG. 1 a greatly simplified representation of a heat recovery apparatus in the manner of a circuit diagram, FIG. 2 a greatly simplified representation of a heat recovery apparatus in the manner of a circuit diagram with another exemplary embodiment, FIG. 3 a greatly simplified representation of a heat recovery apparatus in the manner of a circuit diagram with another exemplary embodiment, FIG. 4 a greatly simplified representation of a heat recovery apparatus in the manner of a circuit diagram with another exemplary embodiment, FIG. 5 a greatly simplified representation of a heat recovery apparatus in the manner of a circuit diagram with another exemplary embodiment.

A heat recovery apparatus 1, as shown in FIG. 1, comprises a circuit 2, in which during the operation of the heat recovery apparatus 1 a working medium circulates. In the circuit 2, an evaporator 3 is arranged which is supplied with heat, by way of which the working medium evaporates. In the shown example, the heat is supplied via the exhaust gas of an internal combustion engine 4, for example of a motor vehicle 5, a component part of which can be the heat recovery apparatus 1. Downstream of the evaporator 3 an expander 6 for expanding the working medium is arranged in the circuit 2, which by expanding the working medium makes available a torque which can be drawn via a shaft 7 of the expander 6. The expander 6 can be designed for example as an axial piston machine 8. Downstream of the expander 6, a condenser 9 is arranged in the circuit 2 in which the working medium is condensed. To this end, the condenser 9 can be flowed through by a cooling fluid. Downstream of the condenser 9 in turn the evaporator 3 is arranged.

The heat recovery apparatus 1 comprises an injector pump 10 for driving the working medium, which comprises a driving fluid inlet 11, a suction inlet 12 and an injector outlet 13. The driving fluid inlet 11 is fluidically connected to the circuit 2 between the evaporator 3 and the expander 6, while the suction inlet 12 is fluidically connected to the circuit 2 between the condenser 9 and the evaporator 3. In addition, the injector outlet 13 is fluidically connected to the circuit 2 between the suction inlet 12 or its connecting point with the circuit 2 and the evaporator 3. Here, the injector pump 10 utilises the working medium evaporated in the evaporator 3 as driving fluid, which flows into the driving fluid inlet 11 and thus sucks in and accelerates condensed working medium via the suction inlet 12, wherein the mixture of evaporated working medium and condensed working medium is accelerated and let out via the injector outlet 13. As a consequence, the working medium is driven or delivered in the circuit 2.

In the shown exemplary embodiment, a storage device 14 is provided, furthermore, which serves for storing working medium and which is fluidically connected or can be fluidically connected to the circuit 2 between the injector outlet 13 and the evaporator 3. The storage device 14 can be designed as a pressure storage device. Alternatively, the storage device 14 can be designed as a spring-preloaded storage device 16 shown in dashed line. Between the injector outlet 13 and the evaporator 3 as well as between the fluidic connection of the storage device 14 and the evaporator 3, an evaporator valve device 17 is arranged, with which the flow of the working medium to the evaporator 3 and thus a volumetric flow of the working medium to the evaporator 3 can be adjusted. In addition, an injector valve device 18, for example a ball cock 19, can be arranged between the evaporator 3 and the driving fluid inlet 11, with which the flow of the working medium to the driving fluid inlet 11 of the injector pump 10 and thus a volumetric flow of the working medium to the driving fluid inlet 11 can be adjusted. Thus, the output of the injector pump 10 can be adjusted, in particular, with the injector valve device 8. In the shown exemplary embodiment, a tank 20 for keeping a supply of working medium is arranged, furthermore, between the condenser 9 and the suction inlet 12, wherein the tank 20 has a volume 21 for the working medium. The volume 21 for the working medium is variable by means of a diaphragm 22, wherein the diaphragm 22 in the shown example is designed as an inflatable bag 23. By means of a compressed-air device 24, the bag 23 can be inflated or air be drained from the bag 23 in order to change the volume 21 of the tank 20 for the working medium. Between the suction inlet 12 and the tank 20 an optional delivery device 25 for delivering the working medium in the circuit 2 is additionally arranged in the circuit 2. The delivery device 25 is electrically or mechanically driven. During the mechanical driving, the delivery device 25 is preferentially driven by the shaft 7 of the expander 6.

In the shown exemplary embodiment, the injector pump 10 is not regulatable per se. The corresponding adjustments with respect to the working medium that is driven by the injector pump 10 is effected via the evaporator valve device 17 and/or the injector valve device 18. In the shown exemplary embodiment, the storage device 14 can be additionally filled with the help of the injector pump. This takes place, in particular when no torque is drawn at the expander 6.

Figure 2:
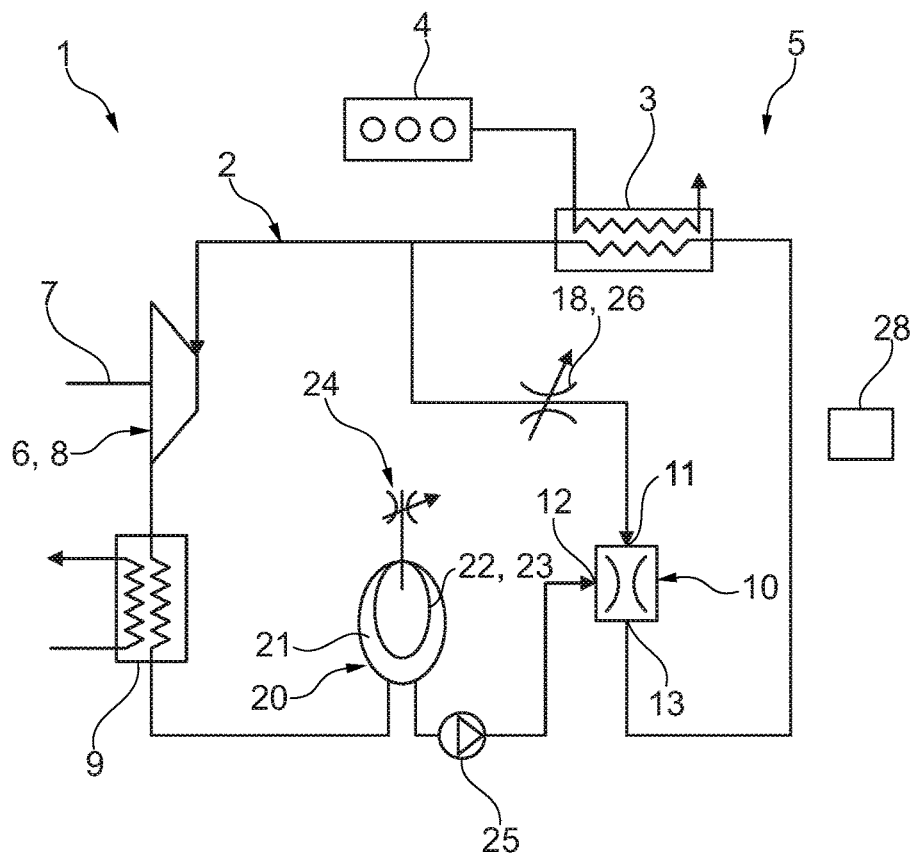

Another exemplary embodiment of the heat recovery apparatus 1 is shown in FIG. 2. This exemplary embodiment differs from the exemplary embodiment shown in FIG. 1 in particular in that no storage device 14 is provided. In addition, no evaporator valve device 17 is provided either. Furthermore, the injector valve device 18 can be formed as a choke 26. Thus, in this exemplary embodiment an adjustment of the injector pump 10 is effected via the injector valve device 18, in particular via the choke 26.

Figure 3:
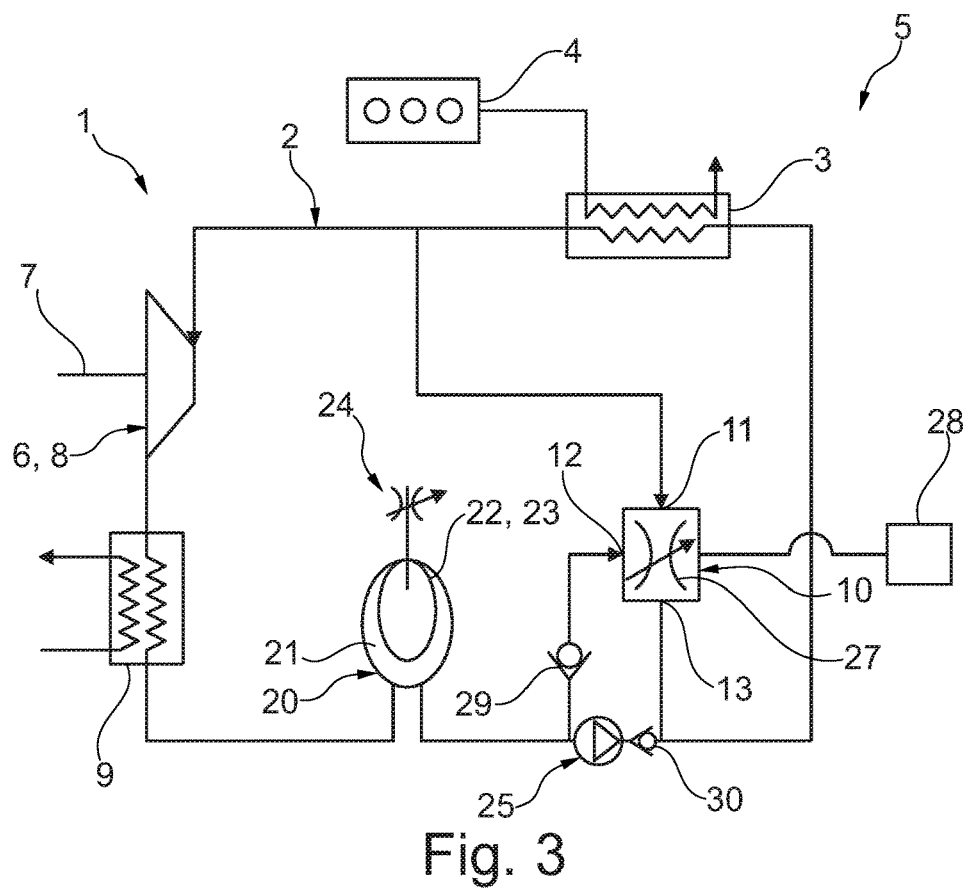

The exemplary embodiment shown in FIG. 3 differs from the exemplary embodiment shown in FIG. 2 in particular in that no injector valve device 18 is provided. Instead, an adjusting device 27 integrated in the injector pump 10 is provided, which adjusts the flow of the working medium through the driving fluid inlet 11 and/or the suction inlet 12. The adjusting device 27 in this case can be controlled by a control device 28. In addition, the delivery device 25 is arranged in the circuit 2 downstream of the connecting point of the suction inlet 12 and upstream of the connecting point of the injector outlet 13 with the circuit 2. Here, a non-return valve 29, in the following named first non-return valve 29 is arranged between the connecting point of the suction inlet 12 with the circuit 2 and the suction inlet 12, while between the connecting point of the injector outlet 13 with the circuit 2 and the delivery device 25 a further non-return valve 30, in the following named second non-return valve 30 is arranged. The first non-return valve 29 ensures that the working medium can flow through the suction inlet 12 merely into the injector pump 10 while the second non-return valve 30 prevents that working medium driven or delivered with the injector pump 10 flows directly to the delivery device.

Figure 4:
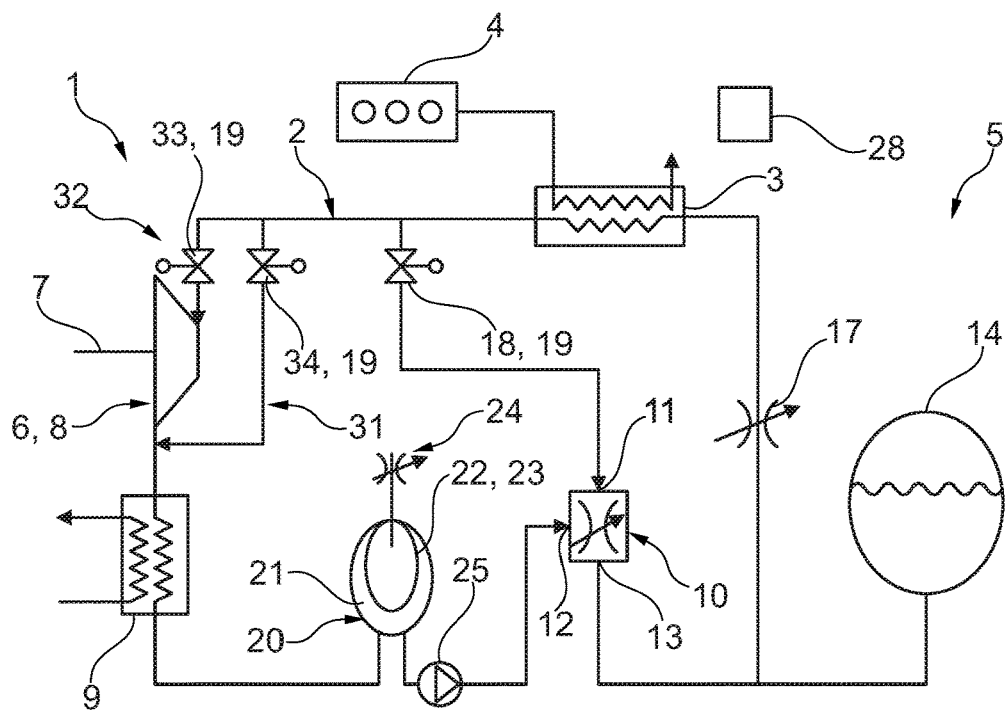

A further exemplary embodiment of the heat recovery apparatus 1 is shown in FIG. 4. This exemplary embodiment differs from the exemplary embodiment shown in FIG. 1 in particular in that the heat recovery apparatus 1 comprises an expander bypass 31 for bypassing the expander 6, which branches off the circuit 2 upstream of the expander 6 and downstream of the evaporator 3 as well as downstream of the connecting point of the driving fluid inlet 11 of the injector pump 10 with the circuit 2 and leads into the circuit 2 downstream of the expander 6 as well as upstream of the condenser 9. In addition, an expander valve device 32 for adjusting the flow of the working medium through the expander bypass 31 is provided. In the shown exemplary embodiment, the expander valve device 32 comprises a first valve 33, for example a ball cock 19, which is arranged in the circuit 2 upstream of the expander 6 and downstream of the branch-off point of the expander bypass 31. The expander valve device 32 additionally comprises a second valve 34, for example a ball cock 19, which is arranged in the expander bypass 31. Here, for filling the storage device 14, preferably the first valve 33 is closed and/or the second valve 34 opened. Thus, the working medium is at least partly conducted past the expander 6. In addition, the injector valve device 18 is at least partly opened. This takes place in particular when drawing the torque at the expander 6 is not required or not desired. Such a situation exists for example when the internal combustion engine 14 in a braking mode is operated for braking the motor vehicle 5 or in a coasting mode in which for driving the motor vehicle 5 no acceleration is necessary.

Figure 5:
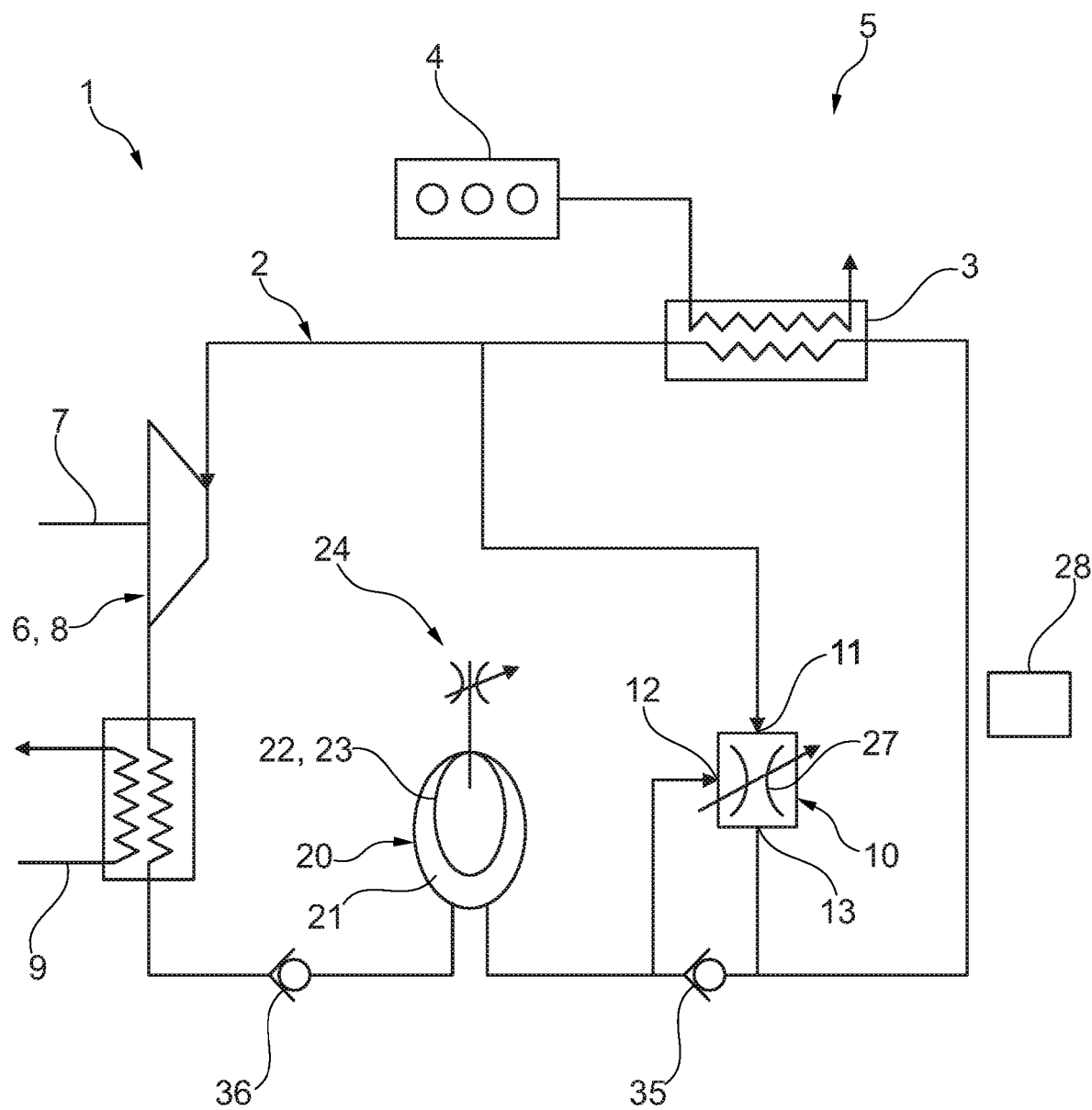

Another exemplary embodiment of the heat recovery apparatus 1 is shown in FIG. 5. This exemplary embodiment differs from the exemplary embodiment in shown in FIG. 3 in particular in that no delivery device 25 is provided. In this exemplary embodiment, the injector pump 10 is employed, in particular exclusively, for delivering the working medium in the circuit 2. Here, a non-return valve 35, in the following also named third non-return valve 35, is arranged in the circuit 2 between the connecting point of the suction inlet 12 and the connecting point of the injector outlet 13 with the circuit 2. A further non-return valve 36, in the following also named fourth non-return valve 36, is arranged in the circuit 2 between the tank 20 and the condenser 9. The third non-return valve 35 prevents a flow of the working medium driven or delivered by the injector pump 10 directly back to the suction inlet 12 or to the tank 20. The second non-return valve 36 prevents a flow of the working medium directly from the tank 20 in the direction of the condenser 9.

The respective valve device 17, 18, 32, the adjusting device 27 and the compressed-air device 24 can each be connected to the control device 28, wherein the control device 28 is configured in such a manner that it can operate the heat recovery apparatus 1. The control device 28 can be employed in particular in order to fill the storage device 14 as described above.

The tank 20, with the volume 21, is employed in particular in order to regulate the temperature of the working medium at the suction inlet 12 of the injector pump 10 and/or at the delivery device 25. Here, the volume 21 is preferably adjusted in such a manner that the working medium at the suction inlet 12 or at the delivery device 25 is supercooled.

In the exemplary embodiment shown in FIG. 5, the volume 21 of the tank 20 can be varied with the help of the compressed-air device in order to drive the working medium in the circuit 2. This takes place in particular when the injector pump 10 does not provide an adequate delivery of the working medium in the circuit 2. This means that the driving of the working medium takes place by means of the changing of the volume 21 in particular during a start-up mode of the heat recovery apparatus 1, in which the evaporator 3, in particular after a prolonged stationary state, is supplied with heat for the first time so that working medium evaporated in the evaporator 3 does not ensure an adequate driving of the working medium by means of the injector pump 10.

The invention claimed is:

1. A heat recovery apparatus, comprising:
   a circuit configured to circulate a working medium during operation;
   an evaporator arranged in the circuit configured to evaporate the working medium, an expander arranged in the circuit downstream of the evaporator configured to expand the working medium, and a condenser arranged in the circuit downstream of the expander configured to condense the working medium;
   the expander including a shaft configured to draw a torque at the expander;
   an injector pump configured to drive the working medium, the injector pump including a driving fluid inlet, a suction inlet and an injector outlet;
   a tank for retaining a supply of the working medium arranged in the circuit between the condenser and the suction inlet, wherein the tank has an adjustable volume that receives the working medium from the condenser;
   wherein the driving fluid inlet is fluidically connected to the circuit between the evaporator and the expander;
   wherein the suction inlet is fluidically connected to the circuit between the tank and the evaporator; and
   wherein the injector outlet is fluidically connected to the circuit between the suction inlet and the evaporator.

2. The heat recovery apparatus according to claim 1, further comprising a storage device configured to store the working medium fluidically connected to the circuit between the injector outlet and the evaporator.

3. The heat recovery apparatus according to claim 1, wherein the circuit further includes an evaporator valve device configured to adjust the flow of the working medium to the evaporator arranged between the injector outlet and the evaporator.

4. The heat recovery apparatus according to claim 1, wherein an injector valve device configured to adjust the flow of the working medium to the driving fluid inlet is arranged between the evaporator and the driving fluid inlet.

5. The heat recovery apparatus according to claim 1, wherein the injector pump comprises an adjusting device configured to adjust the flow of the working medium through the injector pump, the adjusting device arranged within the injector pump.

6. The heat recovery apparatus according to claim 1, further comprising an expander bypass configured to bypass the expander and an expander valve device configured to adjust the flow of the working medium through the expander bypass.

7. The heat recovery apparatus according to claim 1, further comprising a diaphragm arranged in the tank and a compressed-air device configured to adjust the diaphragm in the tank to change the volume for the working medium.

8. The heat recovery apparatus according to claim 1, further comprising a delivery device configured to drive the working medium arranged between the the tank and the evaporator.

9. A method for operating a heat recovery apparatus, the method comprising:
   circulating a working medium through a circuit;
   evaporating the working medium via an evaporator arranged in the circuit;
   expanding the working medium via an expander arranged in the circuit downstream of the evaporator;

condensing the working medium via a condenser arranged in the circuit downstream of the expander;

drawing a torque at the expander via a shaft of the expander;

driving the working medium through the circuit via an injector pump including a driving fluid inlet fluidically connected to the circuit between the evaporator and the expander, a suction inlet fluidically connected to the circuit between the condenser and the evaporator downstream of the condenser, and an injector outlet fluidically connected to the circuit between the suction inlet and the evaporator downstream of the condenser, wherein driving the working medium through the circuit via the injector pump includes receiving evaporated working medium and liquid working medium in the injector pump via the driving fluid inlet and the suction inlet, respectively, and discharging a mixture of evaporated working medium and liquid working medium from the injector pump via the injector outlet to deliver the working medium in circuit;

storing the working medium in a storage device fluidically connected to the circuit between the injector outlet and the evaporator; wherein the storage device is directly downstream of the injector pump; and filling the storage device with the working medium via the injector pump.

10. The method according to claim 9, wherein the storage device is filled with the working medium when the working medium is at least partly conducted past the expander.

11. The heat recovery apparatus according to claim 1, wherein the expander comprises an axial piston machine configured to be driven by the working medium.

12. The heat recovery apparatus according to claim 6, wherein the expander valve device includes a first valve and a second valve, wherein the first valve is arranged in the circuit upstream of the expander and the second valve is arranged in the expander bypass.

13. The heat recovery apparatus according to claim 7, wherein the diaphragm is a bag configured to be inflated by the compressed-air device.

14. The heat recovery apparatus according to claim 7, wherein the tank is configured to adjust a preset temperature at the suction inlet of the injector pump.

15. The heat recovery apparatus according to claim 13, wherein the compressed-air device is further configured to drain air from the bag.

16. A heat recovery apparatus, comprising:
a circuit through which a working medium is flowable;
an evaporator arranged in the circuit configured to evaporate the working medium;
an expander arranged in the circuit downstream of the evaporator configured to expand the working medium, the expander including a shaft configured to draw a torque at the expander;
a condenser arranged in the circuit downstream of the expander configured to condense the working medium;
an injector pump configured to drive the working medium, the injector pump including:
a driving fluid inlet fluidically connected to the circuit between the evaporator and the expander;
a suction inlet fluidically connected to the circuit between the condenser and the evaporator downstream of the condenser; and
an injector outlet fluidically connected to the circuit between the suction inlet and the evaporator downstream of the condenser;
a storage device configured to store the working medium fluidically connected to the circuit between the injector outlet and the evaporator wherein the storage device is directly downstream of the injector pump; and
an evaporator valve device configured to adjust a flow of the working medium to the evaporator arranged between the injector outlet and the evaporator.

17. The heat recovery apparatus according to claim 16 further comprising a tank arranged between the condenser and the suction inlet having a volume for the working medium, a diaphragm arranged in the tank, and a compressed-air device configured to adjust the diaphragm in the tank to change the volume for the working medium.

18. The method according to claim 9, further comprising receiving a supply of the working medium in an adjustable volume of a tank arranged in the circuit between the condenser and the suction inlet.

19. The method according to claim 18, further comprising changing the adjustable volume of the tank via a diaphragm disposed in the tank.

20. The method according to claim 19, wherein changing the adjustable volume via the diaphragm includes inflating or draining the diaphragm with air via a compressed-air machine.

* * * * *